United States Patent
Steinhardt

(10) Patent No.: US 10,168,158 B2
(45) Date of Patent: Jan. 1, 2019

(54) NAVIGATION SYSTEM AND METHOD FOR ERROR CORRECTION

(71) Applicant: HONDA RESEARCH INSTITUTE EUROPE GMBH, Offenbach/Main (DE)

(72) Inventor: Nico Steinhardt, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/491,308

(22) Filed: Apr. 19, 2017

(65) Prior Publication Data
US 2017/0299393 A1 Oct. 19, 2017

(30) Foreign Application Priority Data
Apr. 19, 2016 (EP) .................................... 16165971

(51) Int. Cl.
*G01C 21/16* (2006.01)
*G01S 17/87* (2006.01)
*G01S 19/49* (2010.01)

(52) U.S. Cl.
CPC .......... *G01C 21/165* (2013.01); *G01S 17/875* (2013.01); *G01S 19/49* (2013.01)

(58) Field of Classification Search
USPC ......................................................... 701/501
See application file for complete search history.

(56) References Cited

U.S. PATENT DOCUMENTS

| 7,605,747 B1* | 10/2009 | Mookerjee ............ G01S 13/723 342/106 |
| 7,705,780 B1* | 4/2010 | Khoury ................... G01S 7/021 342/377 |
| 8,275,544 B1* | 9/2012 | Wells ................... G01C 21/165 342/146 |
| 2006/0044943 A1* | 3/2006 | Barger ....................... F41J 5/06 367/127 |

(Continued)

FOREIGN PATENT DOCUMENTS

DE 10 2012 216 211 A1 3/2013

OTHER PUBLICATIONS

European Search Report dated Nov. 4, 2016 corresponding to European Patent Application No. 16165971.9.

*Primary Examiner* — Jean Paul Cass
(74) *Attorney, Agent, or Firm* — Squire Patton Boggs (US) LLP

(57) ABSTRACT

The invention regards a navigation system and a method for error correction. The navigation system comprises a base navigation system and a correction system. Measurement uncertainties are assigned to each measurement and an error threshold is computed on the basis of these uncertainties. Redundant measurements are determined and residuals for at least a pair of redundant measurements as a discrepancy measure are calculated. In case that the residual exceeds a respective threshold an error count for each measurement involved in the determination of the residual is increased. All residuals for each measurement are summed up for a particular measurement and for carrying out the correction in a fusion filter measurements are selected on the basis of their respective error count and summed up residuals.

9 Claims, 2 Drawing Sheets

(56) References Cited

U.S. PATENT DOCUMENTS

| | | | |
|---|---|---|---|
| 2007/0218931 A1* | 9/2007 | Beadle | H04B 7/18589 |
| | | | 455/502 |
| 2009/0238042 A1* | 9/2009 | Hawkinson | G01S 15/025 |
| | | | 367/89 |
| 2012/0109538 A1* | 5/2012 | Covello | F42B 15/01 |
| | | | 702/33 |
| 2014/0201571 A1* | 7/2014 | Hosek | G06F 11/2257 |
| | | | 714/26 |
| 2014/0333479 A1 | 11/2014 | Steinhardt | |
| 2017/0234979 A1* | 8/2017 | Mathews | G01S 19/46 |
| | | | 342/357.64 |
| 2017/0258390 A1* | 9/2017 | Howard | A61B 5/16 |
| 2017/0299393 A1* | 10/2017 | Steinhardt | G01C 21/165 |
| 2017/0300602 A1* | 10/2017 | Leeds | G06F 17/5009 |
| 2017/0301111 A1* | 10/2017 | Zhao | G06T 7/80 |
| 2017/0329048 A1* | 11/2017 | Lemos | G01W 1/10 |
| 2017/0338855 A1* | 11/2017 | Raghupathy | G01S 19/11 |
| 2017/0340447 A1* | 11/2017 | Mahfouz | A61B 34/20 |
| 2017/0343639 A1* | 11/2017 | Ivanov | G01S 5/0252 |
| 2017/0351963 A1* | 12/2017 | Leeds | G06N 7/005 |
| 2017/0359418 A1* | 12/2017 | Sustaeta | G05B 13/0285 |

\* cited by examiner

NAVIGATION SYSTEM AND METHOD FOR ERROR CORRECTION

BACKGROUND

Field

The invention is related to a method for error correction in a system consisting of base system and a correction system, and a navigation system consisting of such base system and correction system.

Description of the Related Art

Many systems that compute, on the basis of sensor measurements, a desired value or information or estimation, for example movement of objects, encounter significant inaccuracy in the results due to uncertainties in the input values from the sensors as well as processing uncertainties. In order to correct for those inaccuracies or input errors, it is known to use additional information derived from other sensors as reference measurement. In many cases, it is possible to combine in that way a base system using measurement technique which is easy to handle, always available and easy to process. This processing can then be combined with additional measurements that are capable of delivering more precise results but the processing of which is for example more time consuming and thus not applicable in any situation. Furthermore, it might be the case that these additional measurements at certain points in time are not available at all. Thus, the more precise measurement is only used in order to correct the less accurate measurement from time to time. A prominent example of such an approach can be found in so-called integrated navigation systems (INS). Such an integrated navigation system consists typically of an inertial measurement unit (IMU) which measures three dimensional accelerations and angular rates. The measured values are then further processed by means of a strapdown algorithm (SA) which computes velocity, pose and position for example of a vehicle or a navigation device held by a person. The combination of IMU and SA can also be called as a base navigation system (BNS) which is one example for a base system as mentioned above.

In such a system the measurement of the three dimensional acceleration and angular rates is of course always available because it is directly possible to recognize a movement or a change in movement of a vehicle or the device where the integrated navigation system is mounted. But the sensors used in such a system often suffer from errors like for example an offset and also the strapdown algorithm uses internal variables that may cause errors when further processing of the measured values is made. Such internal strapdown algorithm errors may for example be integrated sensor offsets. These result from integration of values that are based on the sensor measurements which as mentioned above may comprise an uncorrected offset. Thus, in order to achieve a satisfying position, velocity and pose result of such a navigation system correction of the error is necessary. One approach that is well-known in the art is the implementation of a fusion filter, for example an extended error state space Kalman-filter. By means of such a Kalman-filter (or another filter type) deviations between the results of the base navigation system and a reference measurement is exploited in order to compute correction values which then can be fed back to the base navigation system in order to correct the navigation system output or sensor offset. One reference measurement might be provided by a GPS (global positioning system) that delivers a rather precise position, but is of course not always available, for example in case that the vehicle is in a tunnel or for any other reasons the satellites that are necessary for calculating an actual position are shaded.

In addition, such reference measurement may of course also suffer from errors. In particular, when a GPS system is used, random errors have to be mentioned, for example multipath reception of a satellite signal. Such errors furthermore violate a basic assumption of a Kalman-filter because such errors have no zero-mean and thus, no Gaussian distribution.

Various approaches have been described in the past to improve the detection and compensation of erroneous measurements. Basically, two classes can be identified, namely stochastic methods that use pure statistics and physical-model-based methods that rely on knowledge or models about surrounding conditions. Different aspects are addressed by these different types or classes. On the one side, the stochastic measurement error detection methods usually achieve good results. But the computational effort is pretty high. Furthermore, there is no or very limited possibility of integrating previous knowledge about the measurement set up. Last but not least, such methods show weaknesses in many different measurements. These methods show weaknesses if many different measurements shall be cross-evaluated at the same time. Furthermore, long observation times are necessary, because the basis for the statistics has to be sufficiently large.

Then, on the other side, the physical-model-based methods have great advantages with respect to incorporating previous knowledge about used measurements. Additionally, the processing load caused by the physical-model-based methods is comparably small which allows efficient processing. On the other side, it is self-explanatory that such physical-model-based methods necessarily need concrete knowledge about a particular error which limits the usability also. Finally, in such physical-model-based methods it is difficult to implement stochastic methods so that the two classes as explained above usually are not combined but a particular one is selected in order to satisfy requirements for a specific system.

One approach to combine the two classes is described in DE 10 2012 216 211 A1. For a tightly coupling navigation system that corrects not only the measurement used for the navigational processing itself, but also the measurements used as reference measurements, a two-step detection process for identifying measurements with errors is suggested. The stochastic part consists of an error threshold computation from uncertainties of the base navigation system and the measurements that are conducted for delivering reference values. The stochastic part is not used in order to correct the values or the processing parameters in the end, but only for determining such error threshold.

On the other side, a physical-model-part is divided in the two mentioned steps. In the first step, a set of correction measurements is compared with base navigation system results. This is carried out for any available correction measurement. If the comparison between the correction measurement (or to be more precise the result of the evaluation of a correction measurement) and the result of the base navigation system is then compared with a threshold. Any measurement which results in a deviation above the error threshold is then discarded and not taken into consideration in the second step. In the second step correction measurements with multiple measured values that have known mutual dependencies are analyzed. This means that for example a dependency with respect to a geometry is exploited to mutually check if these measurements are consistent. If the dependency model is not fulfilled, which is the result of such mutual check, within the according error threshold such measurement will also be discarded. The discarded values are then not used for calculating correction values. The problem is that discarding measurement is only determined on the basis of the error count.

SUMMARY

It is thus an object of the invention to improve selection of measurement used for error correction. At first in the system consisting of a base system and a correction system, uncertainties are assigned to each measurement and based thereon error thresholds are computed.

In a next step redundant measurements are determined and for these redundant measurements residuals are determined as a discrepancy measure for the redundancy. This means that if for example a number of satellite signals can be received which is greater than necessary to calculate the current position, velocity, ... by a GPS redundant measurements are available. Thus, using a first set of satellites to compute a first result and a second at least partially different set of satellites for computing a geometric model check is possible. These two distinct results are then compared with each other and the discrepancy for these redundant measurements is determined for every output value (position, velocity, ...). In case that such discrepancy measure for the redundant measurements lies above the respective threshold which has beforehand been calculated on the basis of the uncertainties an error count for each measurement that was involved in determination of the residual exceeding the respective threshold is increased. For example it is simply incremented by one.

In addition to increasing the error count for such measurement for all the measurements the calculated residuals are summed up. This applies to all residuals that are calculated independent from the particular residual lying above or below the threshold. In a last step then measurements are supplied to a fusion filter in order to calculate correction values are selected. The selection is done on the basis of the error count and the summed up residuals.

The new method and navigation system have the advantage that not only an error count is taken into consideration but also the summed up residuals. Thus, the selection of measurements that is further on used in order to calculate correction values is improved because there is the possibility to discard a measurement even in case that the error count is low but the summed up residuals are pretty high. For example if one particular measurement always has residuals when being compared to a redundant measurement that are just below their threshold for increasing the error count summing up these residuals will show significance. Then, with the present invention that uses a combination between the error count and the summed up residuals of a measurement it is possible to discard such measurement nevertheless. Of course, it is also possible to discard a measurement only in case that its error count is above a threshold but to use the summed up residuals for sorting.

According to an advantageous aspect the error threshold is computed by computing a propagation of the uncertainties of the measurements. This has the advantage that the thresholds themselves are self adaptive. It stabilizes the system, because if for example the base system measurements often contradict the correction measurements, the threshold for accepting a correction measurement is automatically increased. Thus, the discrepancy between redundant measurements needs to be much higher the error count of these measurements is increased and as a consequence the basis for evaluating the combination between the error count and the summed up residuals also changes. This leads to a larger number of correction measurements being taken into consideration.

According to another preferred embodiment the selection process is performed by repeatedly disregarding the measurement with the greatest summed residual provided that its error count is greater than zero. After discarding one particular measurement with the highest summed residual the identification of redundant measurements, determination of residuals for these redundant measurements, increasing the error count if the residual exceeds a respective threshold, summing up the residuals for each measurement is repeated. The loop is stopped as soon as there is no measurement left the error count of which is greater than zero. The stepwise selection of one measurement to be discarded at a time and thereafter recalculating the values that are the basis for this selection improves the basis for the analysis. Thus, the risk that a measurement is discarded which would in fact be helpful in order to correct a positioning result or the like is reduced.

According to another advantageous aspect measurements are only discarded if they belong to the correction system. This means that in no case measurements of the base system are discarded. This has the advantage that all the measurements are kept that at least have an analytic redundancy, because these measurements have the highest sampling rate and consequently for each and every measurement there is always at least one (analytic) redundancy to the base system left.

Keeping all the measurements of the base system results in increasing the error threshold(s) that is computed on the basis of the uncertainties (or the propagation of uncertainties) in case that the base system measurement is often in contradiction with the correction measurements leading to discarding many of the correction measurements. Thus, this leads to stabilizing the system.

According to another advantageous embodiment a measurement of a correction system is disregarded even if the combination of the error count and the summed residual does not fulfil the predetermined condition for removal in case that a contradiction between a measurement of the base system and a measurement of the correction system can be recognized. Again this leads to increasing the threshold which is thus also done even if there is no other indication for removing such a correction measurement.

Furthermore it is possible to count the number of contradictions between measurements of the base system and measurements of the correction system and to start a reinitialization of the entire system automatically in case that the counted number of contradictions exceeds a predetermined threshold. Of course the threshold can be adjusted.

The navigation system advantageously comprises an inertial measurement unit, a processing unit for carrying out a strapdown algorithm and a fusion filter which is supplied with the selected measurements.

BRIEF DESCRIPTION OF THE DRAWINGS

Advantageously the correction system comprises at least one of GNSS (global navigation satellite system), odometry, barometer, magnetometer, radars, (stereo) vision, laser scanners, ultrasonic range finders, landmarks, radio location. The inventive navigation system and method will now be shown with respect to the annexed drawing in which.

DETAILED DESCRIPTION

Figure 1:
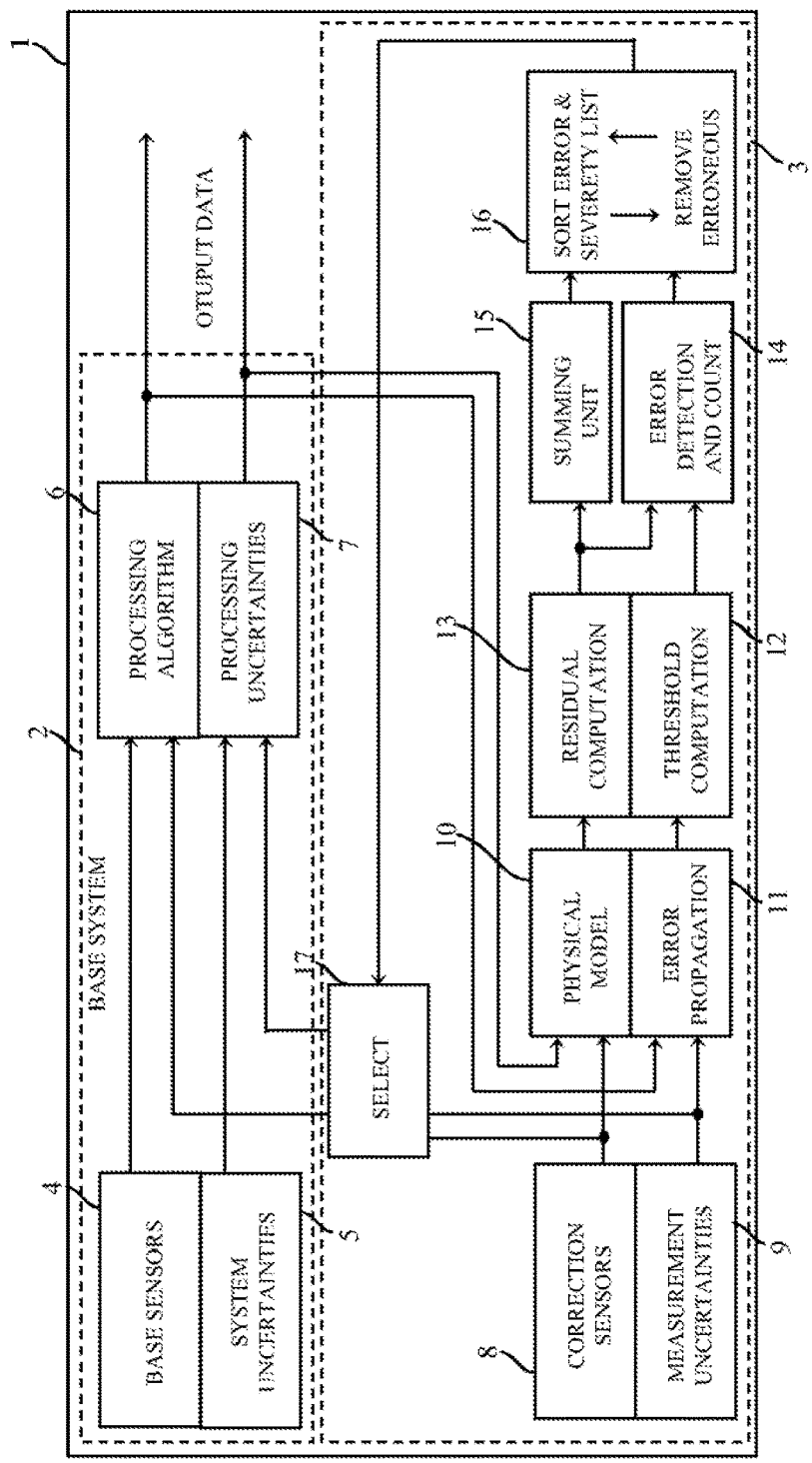
FIG. 1 shows a block diagram to illustrate the components of the navigation system as one embodiment of the invention.

In FIG. 1 a block diagram is shown which illustrates the main functional blocks of a navigation system 1 which is exemplary for an embodiment of the present invention. The entire navigation system 1 consists of a base system 2 and a correction system 3. The base system 2 comprises base sensors 4 such as three dimensional accelerometers and gyroscopes that measure three dimensional accelerations and angular rates. As indicated with reference numeral 5 base system sensor uncertainties are associated with each of the base sensors 4. Such uncertainties may advantageously be variances and co-variances.

The raw data that is output by the base sensors 4 is supplied to a processing algorithm unit 6, for example a strapdown algorithm. By the strapdown algorithm and from the base sensor data output data is calculated that comprises for example values for velocity, position and pose. As indicated by the processing uncertainties 7 in addition to the base system sensor uncertainties there may be uncertainties that are caused by processing the base sensors' data and that of course also result in inaccuracy of the output data. These processing uncertainties are estimated in a variance-covariance-matrix by a stochastic model.

The correction system 3 comprises correction sensors 8. These correction sensors 8 in case of a GPS measurement for correcting the output data deliver GPS raw data measurements that contain the measured distance between satellites and the receiver antenna. These raw data are called pseudoranges.

Again, measurement uncertainties similar to the system uncertainties that are assigned to the base sensors 4 are assigned to the correction sensors 8. The data that is derived from the correction sensors 8 is fed into a physical model unit 10. In the physical model unit 10 redundancy checks are performed and thus for example in case that a higher number of satellites than necessary can be evaluated and redundancies between measurements are determined. In case of a number of received satellite signals is higher than necessary for evaluation, position, velocity and pose is calculated in the physical model unit 10 based on different subsets of satellite signals. These checks are always conducted if at least one redundant pair of measurements is available. There is no constraint to other numbers of measurements. In addition to the raw data from the correction sensors 8, also the output data from the processing algorithm 6 is supplied to the physical model unit 10. In the physical model unit 10 also redundancies between the virtual output on the basis of the correction sensor data and the output data of the processing algorithm 6 is taken into consideration. Necessary transformation of the output of the base system 2 is performed there also. It is in particular worth to note that the sampling rate of the base sensors 4 is higher than the sampling rate of the correction sensors 8. Thus, such analytical redundancy enables a comparison between the output of the physical model on the basis of the correction sensors 8 with the plurality of processing algorithm results.

In addition to the physical model unit 10 there is calculated the propagation of the different measurement uncertainties, namely the uncertainties assigned to the base sensors 4 as well as the correction sensors uncertainties 9. In addition, also the processing uncertainties that are shown in block 7 are taken into consideration for calculating the error propagation. The result of the error propagation calculating unit 11 is exploited for calculating a threshold for errors in order to determine if the comparison between the results of redundant measurements has to be considered as an error. The calculation of such thresholds in the threshold computation unit 12 as such is known already from the state of the art.

On the other side, the output of the physical model unit 10 is fed to a residual computation unit 13 that calculates a discrepancy measure for the redundant measurements. These residuals that are associated with at least a pair of redundant measurements and the calculated error thresholds are supplied to an error detection and count unit 14. In the error detection and count unit 14 the residual is compared with the error threshold and in case that the residual exceeds the error threshold an error count for each of the redundant measurements involved in the residual calculation is increased by one.

Furthermore, the residuals that are calculated in the residual computation unit 13 are supplied to a summing unit 15 that sums up the calculated residuals for each of the measurements individually. For one such measurements all the residuals that are calculated with respect to any available redundant measurement are summed up. This summing up is independent from the determination of an error. The summing up is performed for any measurement. The summed up residuals and the error count value for each measurement are supplied to a list generating unit 16. In the list generating unit 16 the measurements are sorted with their assigned error count and summed up residual. In the list generation unit 16, the list is finally supplied to a selecting unit 17 that supplies the selected measurements to the processing algorithm unit 6 in which an error correction is performed by a fusion filter, such as a Kalman-filter.

By generating the sorted list of measurements which is then fed to the selection unit 17, a reduction of the measurements is performed. The reduction is performed by removing the measurement from the list which is considered to be an erroneous one. A measurement is considered erroneous in case that its error count is not zero and it is the one having the worst influence on a correction of the base system 2. The greatest influence is assumed to be given for the measurement having the greatest residual sum or in particular having the highest weighted sum of error count and residual sum. The list is updated after removing the measurement with the highest residual sum or highest weighted sum under the condition that its error count is not zero. This means that even if the residual sum of a particular measurement should be the highest one, but on the other side the error count is zero for example it will not be removed.

Measurements that are performed by the base sensor unit 4 are never removed. This has the advantage that even if significant measurement errors of the base systems occur these measurements will always be maintained and as a consequence the number of correction measurements will be reduced significantly. This results on the other side in an increasing error threshold.

After removing or discarding one of the measurements all the values being the basis for considering which measurement has to be discarded are recalculated. Thus, the sum of the residuals is calculated newly, the error count for the remaining measurements is calculated newly and also the threshold for determining whether an error exists or not is calculated newly. After the new calculation of all the relevant values again the list is sorted and the next correction measurement with the highest residual sum is removed, again under the condition that its error count is not zero. This procedure is repeatedly carried out until no more measurements are in the list that have an error count not being zero.

It is to be noted that the aforementioned determination of a measurement that has to be discarded is limited to the measurements of the correction system. Measurements of the base system are never removed. This has the advantage that even in case that the measurement of the base system is completely wrong a correction of the system is possible. The reason is that maintaining all the measurements of the base system 2 while simultaneously removing measurements of the correction system 3 result in an increase of the error threshold with every recalculation. As a consequence correction measurements will be maintained even if they have a relatively high residual sum for a particular redundancy check. Thus, the system is self-adaptive.

It is also possible that clear contradictions between the measurement of the base system 2 and the measurement of the correction system 3 is determined and that the number of such contradictions is counted. In case that a threshold for such count is exceeded the system could be reinitialized. Furthermore it is to be noted that while sorting and removing measurements from the list it is also possible to directly remove correction system measurements that are in contradiction with a base system measurement without analyzing the error count or residual sum.

Figure 2:
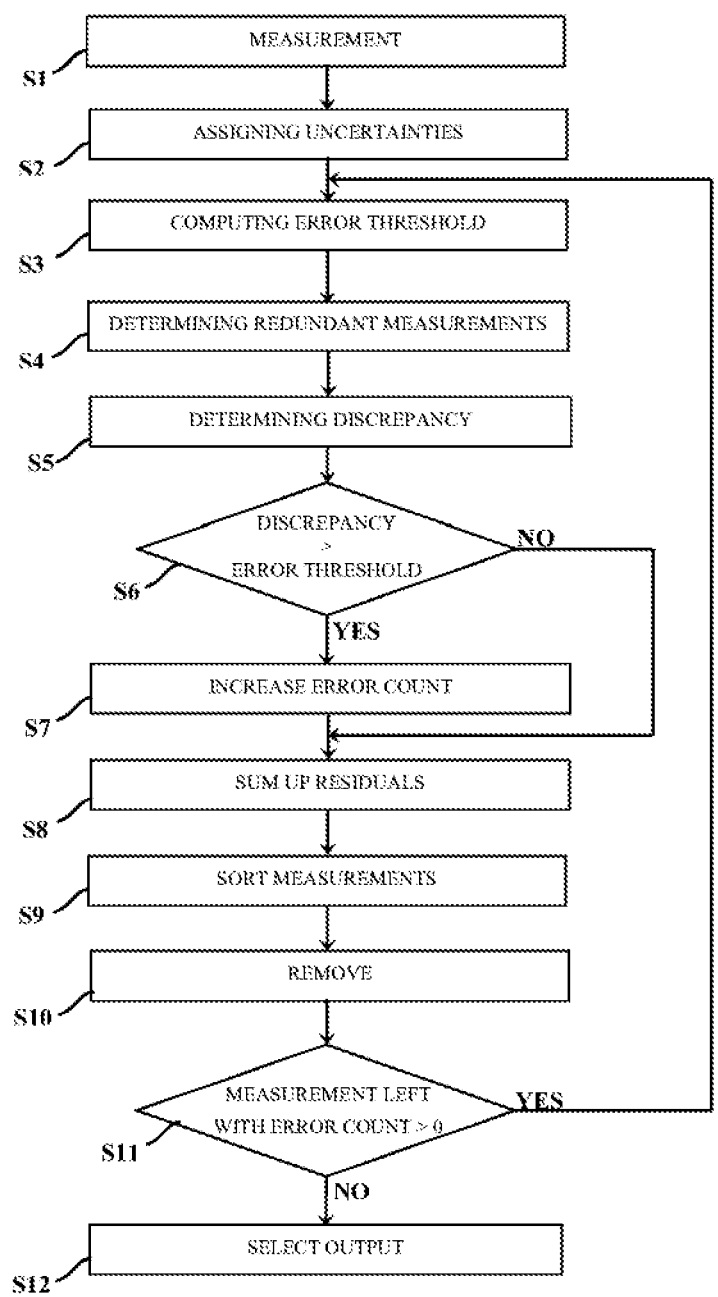
FIG. 2 a simplified flow chart to illustrate the method steps of the invention.

The flow chart as depicted in FIG. 2 illustrates the main steps of the inventive method. At first the measurements are carried out. This means that while the base system 2 as well as the correction system 3 perform the measurements and the output values of the base sensors 4 and the correction sensors 8 are forwarded for further processing. The further processing also comprises as mentioned in step S2 assigning uncertainties to the respective measurements. These uncertainties are used as a basis for computing an error threshold in step S3. The error threshold is computed for any particular value that might be the outcome of the processing of the sensor's raw data.

After the error thresholds have been computed a redundancy analysis is performed (S4). The correction sensors data therefore is fed into a physical model and simultaneously the output data. Step S4 analyzes for any available redundancy of a particular measurement with at least one other measurement of the base system 2 or the correction system 3. Such redundancy might be a redundant correction measurement or, what is called analytical redundancy, a redundancy with a plurality of base system measurements. Such analytical redundancy exists, because the sampling rate of the base system 2 is much higher than the sampling rate of the correction system 3. On the basis of the determined redundancies in step S5 the discrepancy between two redundant measurements (or even more than two redundant measurements) is determined. This discrepancy for one particular measurement is then (step S6) compared with the respective error thresholds. If the threshold is exceeded by the calculated discrepancy then in step S7 an error count for this measurement is increased. Step S7 is skipped in case that the discrepancy does not exceed the error threshold.

In step S8 the sum of all the residuals for a particular measurement is calculated which means that not only the residuals in case of a detected error are summed up but also if redundancy checks did not lead to an increased error count.

The above-mentioned steps S4 to S8 are performed for all the measurements that are available and all redundancies that can be determined. Thus, in the end a number of measurements is available which is sorted in a list that considers the error count but also the summed up residuals of the measurements. After having sorted the measurements in step S9 the measurement with the highest residual sum is removed in step S10 but only in case that its error count is not zero. The reason for this approach is that in case that at least one redundancy check reveals that the calculated residual lies above the threshold for identifying an error this particular measurement is considered to be an erroneous measurement. But as long as there are a plurality of such erroneous measurements it is important to remove only that one with the worst influence on the correction process. Thus, the first condition for a measurement to be removed is that the error count is greater than zero and then under these remaining measurements the one with the highest residual sum is removed first.

After removing this first measurement steps S3 to S8 are repeated. And again one threshold is removed in case that there is a measurement left with an error count not being zero.

At the end of the process only error measurements that with the repeatedly newly calculated error threshold have an error count of zero. These remaining measurements are then used to feed the fusion filter where in the end and in an already known way error correction is performed.

In order to feed the selected measurements to the fusion filter in step S12 the selected measurements are output and forwarded to such fusion filter.

In the described embodiment the invention is explained with respect to a navigation system but in general also other applications might be thought of. The inventive method is applicable for any system which comprises a base system and a correction system and that use a fusion filter exploiting knowledge from a reference measurement in order to improve the processing or correction of the base system measurement.

The invention claimed is:
1. A method for error correction in a navigation system comprising a base navigation system including base sensors and a correction navigation system including correction sensors, wherein the base sensors and the correction sensors each acquire measurements, and the method comprises:
assigning measurement uncertainties to each measurement and computing error thresholds on the basis of the measurement uncertainties;
determining redundant measurements;
determining residuals for the redundant measurements as a discrepancy measure for the redundant measurements by comparing different results computed by subsets of the redundant measurements which differ at least partially;
increasing an error count for each of the redundant measurements involved in determination of the residuals which exceed the respective error thresholds;
individually summing up for each redundant measurement the residuals determined for a particular measurement;
selecting measurements on the basis of the respective error count and the summed up residuals and supplying the selected measurements to a fusion filter for calculating correction values;
correcting, in the fusion filter, the measurements of the base system with the calculated correction values, calculating output data, by the fusion filter, from the corrected measurements and outputting the output data comprising values for position, orientation and velocity.

2. The method according to claim 1, wherein for computing the error thresholds a propagation of the measurement uncertainties is calculated.

3. The method according to claim 1, wherein the selecting of the measurements is performed by recursively disregarding the redundant measurements with the greatest summed residuals, provided that the error count of the redundant measurements is greater than 0, and repeating the determining of the redundant measurements, the determining of the residuals, the increasing of the error count, the individually summing up, the selecting of the measurements, and the correcting of the measurements thereafter, while ignoring the disregarded redundant measurements until no redundant measurement having the error count greater than 0 is left.

4. The method according to claim 1, wherein only redundant measurements that belong to the correction system are disregarded.

5. The method according to claim 1, wherein in case of a contradiction between a measurement of the base system and a measurement of the correction system, the measurement of the correction system is disregarded.

6. The method according to claim 5, wherein a number of contradictions between measurements of the base system and measurements of the correction system is counted and re-initialization of the navigation system is automatically started if the counted number exceeds a predetermined threshold.

7. A navigation system comprising the base navigation system and the correction system, wherein the navigation system performs the method according to claim 1.

8. The navigation system according to claim 7, wherein the base navigation system comprises:

an inertial measurement unit, a processing unit for carrying out a strapdown algorithm, wherein the strapdown algorithm computes a velocity, a pose and a position, and the fusion filter which is supplied with the selected measurements.

9. The navigation system according to claim 7, wherein the correction system comprises at least one of GNSS, odometry, barometer, magnetometer, radars, stereo vision, laser scanners, ultrasonic rangefinders, landmarks, radio location.

* * * * *